United States Patent

Tanaka

[11] Patent Number: 5,587,744
[45] Date of Patent: Dec. 24, 1996

[54] IMAGE DISPLAY APPARATUS

[75] Inventor: Yasuyuki Tanaka, Tokyo, Japan

[73] Assignee: Canon Kabushiki Kaisha, Tokyo, Japan

[21] Appl. No.: 447,838

[22] Filed: May 23, 1995

Related U.S. Application Data

[63] Continuation of Ser. No. 176,306, Jan. 3, 1994, abandoned, which is a continuation of Ser. No. 672,837, Mar. 21, 1991, abandoned.

[30] Foreign Application Priority Data

Mar. 26, 1990 [JP] Japan .................................. 2-77493

[51] Int. Cl.⁶ .................................................. H04N 5/46
[52] U.S. Cl. ............................................ 348/556; 348/553
[58] Field of Search ....................... 348/469, 553, 348/554, 555, 556, 557, 558, 704, 706, 725, 563, 445, 441; 358/11, 180, 188, 183, 140, 22, 13; 345/1, 2, 3; H04N 5/44, 5/445, 5/46, 3/27

[56] References Cited

U.S. PATENT DOCUMENTS

| | | | |
|---|---|---|---|
| 3,097,262 | 7/1963 | Ehrenhaft | 358/180 |
| 4,385,324 | 5/1983 | Shioda et al. | 358/237 |
| 4,394,690 | 7/1983 | Kobayashi | 358/180 |
| 4,449,143 | 5/1984 | Dischert et al. | 358/140 |
| 4,496,974 | 1/1985 | Heitmann | 358/140 |
| 4,605,952 | 8/1986 | Powers | 358/13 |
| 4,651,208 | 3/1987 | Rhodes et al. | 358/180 |
| 4,672,443 | 6/1987 | Dischert et al. | 358/12 |
| 4,864,405 | 9/1989 | Chambers | 358/180 |
| 4,956,707 | 9/1990 | Oakley et al. | |

FOREIGN PATENT DOCUMENTS

| | | |
|---|---|---|
| 0162501 | 11/1985 | European Pat. Off. |
| 0276985 | 8/1988 | European Pat. Off. |
| 0314079 | 12/1989 | Japan . |
| 0096091 | 4/1991 | Japan . |
| 0005644 | 9/1986 | WIPO . |

Primary Examiner—David E. Harvey
Attorney, Agent, or Firm—Robin, Blecker, Daley & Driscoll

[57] ABSTRACT

An input image signal is converted along a time base into an image signal having an aspect ratio different from that of the input image signal. An image corresponding to the converted image signal is supplied to an image display unit, thereby faithfully displaying an image corresponding to the input image signal without degrading the image quality.

18 Claims, 3 Drawing Sheets

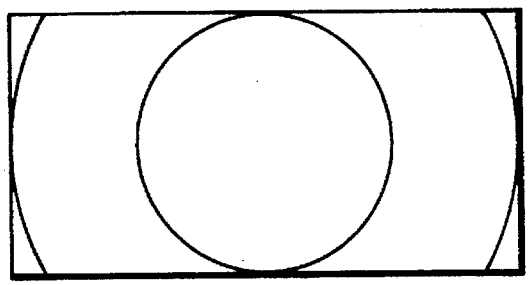
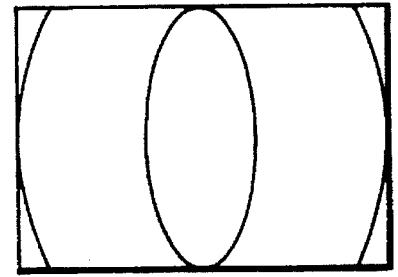
FIG. 3A    FIG. 3B
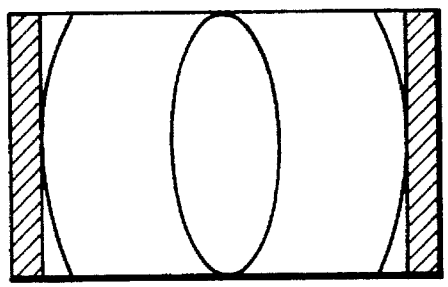
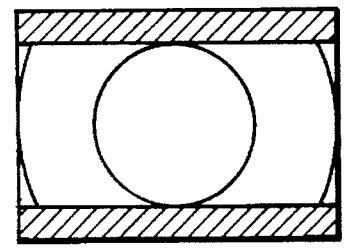
FIG. 3C    FIG. 3D ically switching to display a television signal of a high-
IMAGE DISPLAY APPARATUS This is a continuation of prior application Ser. No. 08/176,306, filed Jan. 3, 1994 (abandoned), which is a continuation of Ser. No. 07/672,837, filed Mar. 21, 1991, abandoned.

BACKGROUND OF THE INVENTION

1. Filed of the Invention

The present invention relates to an image display apparatus for displaying images complying with different types of display schemes.

2. Related Background Art

Conventional image display apparatuses capable of selectively switching to display a television signal of a high-vision scheme and a television signal of an NTSC scheme are an apparatus having a display screen aspect ratio of 9:16 complying with the high-vision scheme and an apparatus having a display screen aspect ratio of 3:4 complying with the NTSC scheme.

In the former apparatus, in order to display a television signal of the NTSC scheme, an actual display screen is located at the central portion of the entire display screen, and both sides of the entire display screen are displayed as blank portions. In the latter apparatus, in order to display a television signal of the high-vision scheme, an actual display screen is located at the central portion of the entire display screen, and the upper and lower portions of the entire screen are displayed as blank portions.

In order to display a television signal of the NTSC scheme in the former apparatus, the normally interlaced NTSC television signal is subjected to interpolation processing, and the interpolated television signal is displayed in the form of a non-interlaced signal. In order to display a high-vision television signal in the latter apparatus, interlaced scanning is performed in only the vertical direction or both the vertical and horizontal directions. In addition, the image is compressed, or the resolution is suppressed, thereby displaying the resultant image.

When an image corresponding to the high-vision television signal is to be displayed on the image display apparatus complying with the NTSC television signal, since interlaced scanning is performed in only the vertical direction or in both the vertical and horizontal directions of the high-vision television signal, an image represented by the input television signal cannot be entirely displayed, or image quality may be greatly degraded.

SUMMARY OF THE INVENTION

It is an object of the present invention to provide an image display apparatus capable of solving the conventional problems described above.

It is another object of the present invention to provide an image display apparatus capable of faithfully displaying an image corresponding to an input image signal.

In order to achieve the above objects according to an aspect of the present invention, there is provided an image display apparatus for displaying an image corresponding to an image signal, comprising:

an image display device for displaying the image corresponding to the image signal; and image converting means for receiving a first image signal, converting the input first image signal along a time base into a second image signal having an aspect ratio different from that of the first image signal, and supplying the second image signal to the image display device.

It is still another object of the present invention to provide an image display apparatus capable of displaying an image corresponding to an input image signal without degrading image quality.

In order to achieve the above object according to another aspect of the present invention, there is provided an image display apparatus for displaying an image corresponding to an image signal, comprising:

an image display device for displaying the image corresponding to the image signal;

image converting means for receiving a first image signal, converting the input first image signal along a time base into a second image signal having an aspect ratio different from that of the first image signal, and supplying the second image signal to the image display device; and scanning control means for controlling a scanning range of the image display device in accordance with the aspect ratio of the image signal supplied from the image converting means.

The above and other objects, features, and advantages of the present invention will be apparent from the following detailed description of the preferred embodiments in conjunction with the accompanying drawings.

BRIEF DESCRIPTION OF THE DRAWINGS

FIGS. 3A to 3D are views showing images displayed on a display device of a monitor apparatus so as to explain an operation of the embodiment shown in FIG. 2.

DETAILED DESCRIPTION OF THE PREFERRED EMBODIMENTS

The present invention will be described with reference to preferred embodiments of the present invention.

Figure 1:
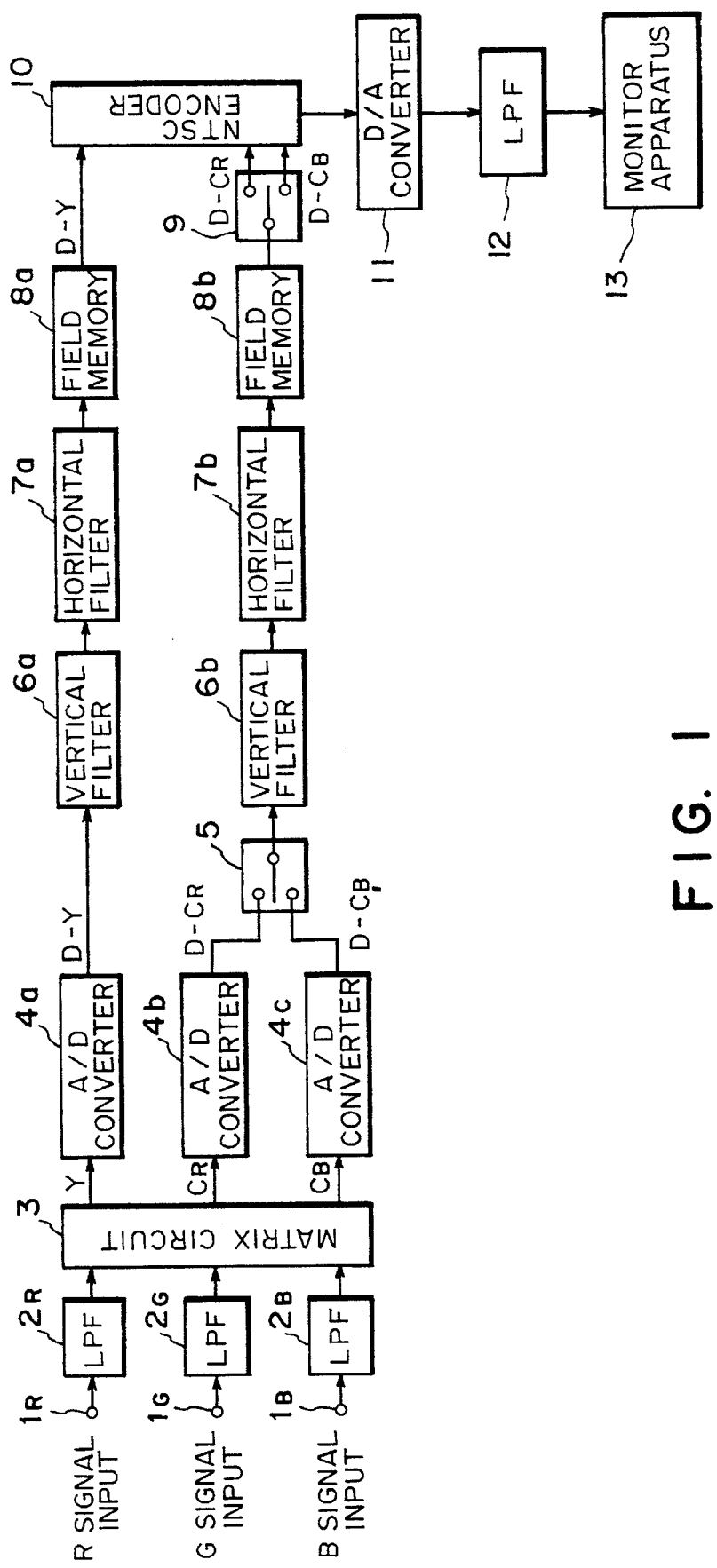
FIG. 1 is a block diagram showing a schematic arrangement of an image display apparatus according to an embodiment of the present invention.

FIG. 1 is a block diagram showing a schematic arrangement of an image display apparatus according to an embodiment of the present invention.

Referring to FIG. 1, a high-vision television signal is supplied to input terminals $1_R$, $1_G$, and $1_B$ in the forms of R, G, and B signals. The R signal is input from the input terminal $1_R$ and is band-limited to about 20 MHz by an LPF (Low-Pass Filter) $2_R$. The G signal is input from the input terminal $1_G$ and is band-limited to about 20 MHz by an LPF $2_G$. The B signal is input from the input terminal $1_B$ and is band-limited to about 20 MHz by an LPF $2_B$. Signals band-limited by the LPFs $2_R$, $2_G$, and $2_B$ are supplied to a matrix circuit 3.

The R, G, and B signals input to the matrix circuit 3 are converted into a luminance signal Y, and color difference signals, i.e., R-Y and B-Y signals $C_R$ and $C_B$. The Y signal is input to an A/D converter 4a, the $C_R$ signal is input to an A/D converter 4b, and the $C_B$ signal is input to an A/D converter 4c.

The Y signal supplied to the A/D converter 4a is digitized at a 64.125-MHz sampling frequency $f_s$. The digital Y signal is input to a vertical filter 6a.

The vertical filter 6a has a line delay line, and the structure of sampling points in the vertical direction is converted to perform vertical filtering so as to reduce the number of scanning lines. The digital Y signal processed by a vertical filtering process by the vertical filter 6a is supplied to a horizontal filter 7a.

The horizontal filter 7a has a pixel delay line to convert a structure of horizontal sampling points to perform horizontal filtering so as to reduce the number of horizontal sampling points. The digital Y signal obtained after horizontal filtering processing by the horizontal filter 7a is supplied to a field memory 8a.

The field memory 8a serves as a buffer for absorbing a time error caused by a difference between the high-vision scheme and the NTSC scheme by controlling the write and read timings of the digital Y signal. The digital Y signal converted along the time base by the field memory 8a is supplied to an NTSC encoder 10.

The $C_R$ signal supplied to the A/D converter 4b is digitized at a 32.0625-MHz sampling frequency $f_s'$. The $C_B$ signal supplied to the A/D converter 4c is converted at a 32.0625-MHz sampling frequency $f_s'$ as in the A/D converter 4b.

The digital $C_R$ and $C_B$ signals digitized by the A/D converters 4b and 4c are supplied to a switch 5. For every sampling period, the switch 5 alternately outputs the digital $C_R$ and $C_B$ signals formed by sampling at the sampling frequency $f_s'$ which is ½ the sampling frequency $f_s$ of the Y signal. A digital C signal as a time-divisional multiplexed signal of the digital $C_R$ and $C_B$ signals is formed and output to a vertical filter 6b.

The vertical filter 6b has a line delay line, and the structure of sampling points in the vertical direction is converted to perform vertical filtering so as to reduce the number of scanning lines. The digital C signal obtained after vertical filtering by the vertical filter 6b is supplied to a horizontal filter 7b.

The horizontal filter 7b has a pixel delay line to convert a structure of horizontal sampling points to perform horizontal filtering so as to reduce the number of horizontal sampling points. The digital C signal obtained after horizontal filtering processing by the horizontal filter 7b is supplied to a field memory 8b.

The field memory 8b serves as a buffer for absorbing a time error caused by a difference between the high-vision scheme and the NTSC scheme by controlling the write and read timings of the digital C signal. The digital C signal converted along the time base by the field memory 8b is supplied to a switch 9. The switch 9 is alternately switched every sampling period to separate the digital $C_R$ and $C_B$ signals time-divisionally multiplexed as the digital C signal. The separated $C_R$ and $C_B$ signals are supplied to the NTSC encoder 10.

The NTSC encoder 10 generates a digital television signal complying with the NTSC scheme by using the digital Y signal, and the digital $C_R$ and $C_B$ signals, and supplies the digital television signal to a D/A converter 11.

The digital television signal has a bandwidth equal to a signal obtained by sampling an NTSC television signal at a sampling frequency $4f_{sc}$ ($f_{sc}$ is the color subcarrier frequency).

The digital television signal supplied from the NTSC encoder 10 is converted into an analog signal in the D/A converter 11, and the frequency band of the analog signal is limited to 5 MHz by an LPF 12 connected to the output terminal of the D/A converter 11. An output from the LPF 12 is supplied to a monitor apparatus 13.

The monitor apparatus 13 corresponds to the NTSC television signal and has a display device having an aspect ratio of 3:4. The monitor apparatus 13 displays the television signal supplied from the LPF 12.

In the embodiment having the arrangement shown in FIG. 1, the high-vision television signal is converted into an NTSC television signal by using the vertical and horizontal filters. The high-vision television signal can be displayed on the monitor apparatus corresponding to the NTSC television signal so as not to cause degradation of image quality of the high-vision television signal and not to form a blank portion or the like in the display device of the monitor apparatus.

Another embodiment of the present invention will be described below.

Figure 2:
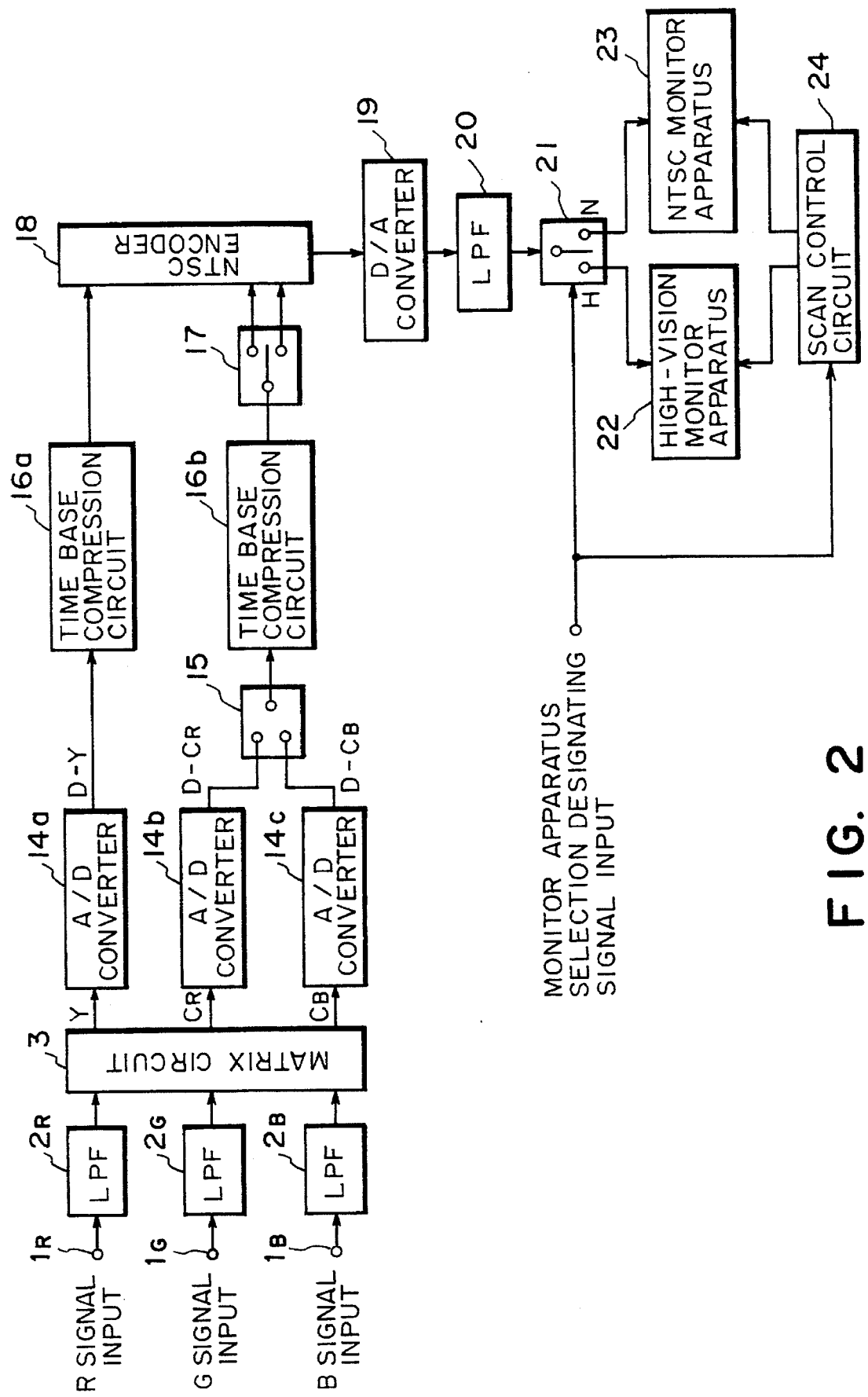
FIG. 2 is a block diagram showing a schematic arrangement of an image display apparatus according to another embodiment of the present invention.

FIG. 2 is a block diagram showing a schematic arrangement of an image display apparatus according to the second embodiment of the present invention. The same reference numerals as in the embodiment shown in FIG. 1 denote the same parts in FIG. 2, and a detailed description thereof will be omitted.

Referring to FIG. 2, a high-vision television signal representing an image shown in FIG. 3A is supplied to input terminals $1_R$, $1_G$, and $1_B$ in the form of R, G, and B signals. The R, G, and B signals are converted into a luminance signal Y and color difference signals, i.e., R-Y and B-Y signals $C_R$ and $C_B$ by a matrix circuit 3 in the same manner as in the embodiment of FIG. 1. The Y signal is input to an A/D converter 14a, the $C_R$ signal is input to an A/D converter 14b, and the $C_B$ signal is input to an A/D converter 14c.

The Y signal supplied to the A/D converter 14a is digitized at a 64.125-MHz sampling frequency $f_s$. The digital Y signal is input to a time base compression circuit 16a.

The time base compression circuit 16a compresses the time base so as to correct a horizontal scanning period difference caused by a difference between the high-vision and NTSC schemes by controlling the write and read timings of the digital Y signal. The digital Y signal time-based compressed by the time base compression circuit 16a is supplied to an NTSC encoder 18.

The A/D converter 14b converts the input $C_R$ signal into a digital signal at a 32.0625-MHz sampling frequency. Similarly, the A/D converter 14c converts the input $C_B$ signal into a digital signal at a 32.0625-MHz sampling frequency as in the A/D converter 14b.

The digital $C_R$ and $C_B$ signals digitized by the A/D converters 14b and 14c are supplied to a switch 15. For every sampling period, the switch 15 alternately outputs the digital $C_R$ and $C_B$ signals sampled at the sampling frequency $f_s'$ which is ½ the sampling frequency $f_s$ of the Y signal, thereby forming a digital C signal obtained by time-divisionally multiplexing the digital $C_R$ and $C_B$ signals. The digital C signal is supplied to a time base compression circuit 16b.

The time base compression circuit 16b has a memory and compresses the time base so as to correct a horizontal scanning period difference caused by a difference between the high-vision and NTSC schemes by controlling the write and read timings of the digital C signal. The digital C signal time-based compressed by the time base compression circuit 16b is supplied to a switch 17. The switch 17 is switched every sampling period to separate the digital C signal into its components, i.e., the digital $C_R$ and $C_B$ signals. The digital $C_R$ and $C_B$ signals are supplied to the NTSC encoder 18.

The NTSC encoder 18 forms a digital television signal complying with the NTSC scheme by using the digital Y signal and the digital $C_R$ and $C_B$ signals. The NTSC digital television signal is supplied to a D/A converter 19.

The digital television signal has a bandwidth equal to a signal obtained by sampling an NTSC television signal at a sampling frequency $4f_{sc}$ ($f_{sc}$ is the color subcarrier frequency).

The digital television signal supplied from the NTSC encoder 18 is converted into an analog signal in the D/A converter 19, and the frequency band of the analog signal is limited by an LPF 20 connected to the output terminal of the D/A converter 19. An output from the LPF 20 is supplied to a switch 21. Note that the time base of an image represented by the television signal output from the LPF 20 is compressed in the horizontal direction, as shown in FIG. 3B.

The switch 21 is arranged to supply the television signal from the LPF 20 to one of a high-vision monitor apparatus 22 having a display device with an aspect ratio of 9:16 and an NTSC monitor apparatus 23 having a display device with an aspect ratio of 3:4. The switching operation of the switch 21 is controlled by a monitor apparatus selection designating signal output from a system controller (not shown).

When an image display on the high-vision monitor apparatus 22 is designated by the monitor apparatus selection designating signal, the switch 21 is set to the H position. The television signal output from the LPF 20 is supplied to the high-vision monitor apparatus 22 through the switch 21 set at the H position.

When the television signal output from the LPF 20 is displayed on the high-vision monitor apparatus 22, an image shown in FIG. 3C is displayed on the display device of the monitor apparatus 22. In this embodiment, a scan control circuit 24 is arranged to increase a horizontal scanning range of the high-vision monitor apparatus 22 when an image display on the high-vision monitor apparatus 22 is designated by the monitor apparatus selection designating signal. An image without any distortion, as shown in FIG. 3A, is displayed on the display device.

When an image display on the NTSC monitor apparatus 23 is designated by the monitor apparatus selection designating signal, the switch 21 is connected to the N position. The television signal output from the LPF 20 is supplied to the NTSC monitor apparatus 23 through the switch 21 connected to the N position.

When the television signal output from the LPF 20 is displayed on the NTSC monitor apparatus 23 without any processing, an image shown in FIG. 3B is displayed on the display device of the monitor apparatus 23. When the image display on the NTSC monitor apparatus 23 is designated by the monitor apparatus selection designating signal, the vertical scanning range of the NTSC monitor apparatus is narrowed by the scan control circuit 24, thereby displaying an image without any distortion on the display device, as shown in FIG. 3D.

In the embodiment shown in FIG. 2, when the image represented by the high-vision television signal is compressed along the time base in the horizontal direction so as to convert it into an image size represented by an NTSC television signal, and the converted image is to be displayed on the monitor apparatus, the horizontal or vertical scanning range of the monitor apparatus is controlled in accordance with the types of monitor apparatuses. Therefore, distortion of the image represented by the high-vision signal can be prevented, and a faithful display can be performed.

As has been described above, according to the present invention, there can be provided an image display apparatus capable of faithfully displaying an image corresponding to an input image signal without degrading the image quality.

What is claimed is:

1. An image display apparatus for displaying an image corresponding to an image signal, comprising:

(A) a first image display unit having a display screen of a first aspect ratio, for displaying the image corresponding to the image signal;

(B) a second image display unit having a display screen of a second aspect ratio different from said first aspect ratio, for displaying the image corresponding to the image signal;

(C) display selection designation means for selectively designating on which of said first image display unit and said second image display unit an image corresponding to a first image signal representative of an image having said first aspect ratio is to be displayed;

(D) image converting means for receiving the first image signal, converting said image having the first aspect ratio into an image having the second aspect ratio by changing a time base of the received first image signal so as to provide a horizontal scanning period of a second image signal corresponding to the image having said second aspect ratio, and outputting the image signal corresponding to the converted image having said second aspect ratio to the image display unit designated by said display selection designation means; and (E) scanning control means for controlling a scanning range to the display screen of the image display unit designated by said display selection designation means, according to the aspect ratio of the display screen of the image display unit designated by said display selection designation means.

2. An apparatus according to claim 1, wherein said image converting means includes:

(1) analog-digital converting means for converting the input first image signal into a digital image signal and outputting the digital image signal;

(2) storage means for temporarily storing the digital image signal output from said analog-digital converting means, and outputting the digital image signal; and (3) digital-analog converting means for converting the digital image signal output from said storage means into an analog signal.

3. An apparatus according to claim 2, wherein said storage means is arranged to correct a time base error of the digital image signal output from said analog-digital converting means, the time base error being caused by a difference between aspect ratios of the images corresponding respectively to the first and second image signals.

4. An apparatus according to claim 1, wherein the first image signal includes a luminance signal and two kinds of color difference signals.

5. An apparatus according to claim 4, wherein said image converting means includes:

(1) first analog-digital converting means for converting an input luminance signal into a digital luminance signal and outputting the digital, luminance signal;

(2) second analog-digital converting means for converting one input color difference signal into a digital color difference signal and outputting the digital color difference signal;

(3) third analog-digital converting means for converting the other color difference signal into a digital color difference signal and outputting the digital color difference signal;

(4) time-division multiplexing means for receiving the digital color difference signal output from said second analog-digital converting means and the digital color difference signal output from said third analog-digital converting means, alternately outputting the digital color difference signals upon every sampling, time-divisionally multiplexing the digital color difference signals, and outputting a time-divisionally multiplexed signal;

(5) first storage means for temporarily storing the digital luminance signal output from said first analog-digital converting means and outputting the digital luminance signal;

(6) second storage means for temporarily storing the multiplexed signal output from said time-division multiplexing means and outputting the multiplexed signal;

(7) separating means for separating the two kinds of digital color difference signals from the multiplexed signal output from said second storage means, and outputting the two kinds of digital color difference signals;

(8) digital image signal forming means for forming a digital image signal by using the digital luminance signal output from said first storage means and the two kinds of digital color difference signals output from said separating means; and (9) digital-analog converting means for converting the digital image signal output from said digital image signal forming means into an analog signal and outputting the analog signal.

6. An apparatus according to claim 1, wherein said first display unit has a display screen having an aspect ratio corresponding to a high-definition television scheme, and said second display unit has a display screen having an aspect ratio corresponding to an NTSC, PAL, or SECAM television scheme.

7. An apparatus according to claim 1, wherein said first image display unit has the display screen having an aspect ratio of 9:16, and said second image display unit has the display screen having an aspect ratio of 3:4.

8. An apparatus according to claim 1, wherein the first image signal is an image signal corresponding to a high-definition television scheme, and the second image signal is a signal corresponding to an NTSC, PAL, or SECAM television scheme.

9. An apparatus according to claim 1, wherein the first image signal is an image signal having an aspect ratio of 9:16, and the second image signal is an image signal having an aspect ratio of 3:4.

10. An apparatus according to claim 1, wherein said scanning control means controls the horizontal scanning range of the image display unit designated by said display selection designation means so as to increase comparatively with said second aspect ratio.

11. An apparatus according to claim 1, wherein said scanning control means controls the vertical scanning range of the image display unit designated by said display selection designation means so as to decrease comparatively with said second aspect ratio.

12. An image display apparatus for displaying an image corresponding to an image signal, comprising:

(A) an image display unit having a plurality of display screens with each screen having a predetermined aspect ratio for displaying the image corresponding to the image signal;

(B) image converting means for receiving the image signal of the image having a first aspect ratio and converting the image of the received image signal into an image having a second aspect ratio and outputting the converted signal corresponding to the converted image having the second aspect ratio to the image display unit; and (C) scanning control means for receiving a selection designating signal to be used to cause one of the plurality of display screens of said image display unit to display the image with the first aspect ratio or the second aspect ratio and for controlling a scanning range of the one display screen of the plurality of display screens of the image display unit according to the received selection designating signal.

13. An apparatus according to claim 12, wherein said image converting means includes:

(1) analog-digital converting means for converting the input received image signal into a digital image signal and outputting the digital image signal;

(2) storage means for temporarily storing the digital image signal output from said analog-digital converting means, and outputting the stored digital image signal; and (3) digital analog converting means for converting the stored digital image signal output from said storage means into an analog signal.

14. An apparatus according to claim 12, wherein the image signal includes a luminance signal and two kinds of color difference signals.

15. An apparatus according to claim 14, wherein said image converting means includes:

(1) first analog-digital converting means for converting an input luminance signal into a digital luminance signal and outputting the digital luminance signal;

(2) second analog-digital converting means for converting one input color difference signal into a digital color difference signal and outputting a digital color difference signal;

(3) third analog-digital converting means for converting the other input color difference signal into a digital color difference signal outputting a digital color difference signal;

(4) time-division multiplexing means for receiving and sampling the color difference signal output from said second analog-digital converting means and the digital color difference signal output from said third analog-digital converting means, alternately outputting the received digital color difference signals upon each sampling, time-divisionally multiplexing the sampled digital color difference signals, and outputting a time-divisionally multiplexed signal;

(5) first storage means for temporarily storing the digital luminance signal output from said first analog-digital converting means and outputting the stored digital luminance signal;

(6) second storage means for temporarily storing the time-divisionally multiplexed signal output from said time-division multiplexing means and outputting the stored time-divisionally multiplexed signal;

(7) separating means for separating the two kinds of digital color difference signals from the time-divisionally multiplexed signal output from said second storage means, and outputting two kinds of digital color difference signals;

(8) digital image signal forming means for forming a digital image signal by using the digital luminance signal output from said first storage means and the two kinds of digital color difference signals output from said separating means; and (9) digital-analog converting means for converting the digital image signal output from said digital image signal forming means into an analog signal and outputting the analog signal.

16. An apparatus according to claim 12, wherein the first aspect ratio corresponds to an aspect ratio of a high-definition television scheme, and the second aspect ratio corresponds to an aspect ratio of an NTSC, PAL, or SECAM television scheme.

17. An apparatus according to claim 12, wherein said scanning control means controls the scanning range in the horizontal direction of the image display unit so as to enlarge said scanning range in the horizontal direction in comparison with the aspect ratio of the display screen of said image display unit, in response to receiving of a display selection designation signal for designating said image display unit to display the image corresponding to the image signal with the second aspect ratio.

18. An apparatus according to claim 12, wherein said scanning control means controls the scanning range in the vertical direction of the image display unit so as to reduce said scanning range in the vertical direction in comparison with the aspect ratio of the display screen of said image display unit, in response to receiving of a display selection designation for designating said image display unit to display the image corresponding to the image signal with the second aspect ratio.

* * * * *